US012673505B2

(12) United States Patent
Fukuda et al.

(10) Patent No.: US 12,673,505 B2
(45) Date of Patent: Jul. 7, 2026

(54) LIQUID DISCHARGE APPARATUS AND LIQUID DISCHARGE METHOD

(71) Applicants: Hiroaki Fukuda, Kanagawa (JP); Dai Kurabayashi, Kanagawa (JP); Paru Kondo, Kanagawa (JP); Takuroh Sawada, Kanagawa (JP)

(72) Inventors: Hiroaki Fukuda, Kanagawa (JP); Dai Kurabayashi, Kanagawa (JP); Paru Kondo, Kanagawa (JP); Takuroh Sawada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 249 days.

(21) Appl. No.: 18/731,598

(22) Filed: Jun. 3, 2024

(65) Prior Publication Data

US 2024/0399759 A1     Dec. 5, 2024

(30) Foreign Application Priority Data

Jun. 5, 2023     (JP) ................................. 2023-092417

(51) Int. Cl.
*B41J 2/21*          (2006.01)
*B41J 11/00*        (2006.01)
(Continued)

(52) U.S. Cl.
CPC ........... *B41J 2/2135* (2013.01); *B41J 11/007* (2013.01); *B41J 11/0095* (2013.01); *G06K 15/102* (2013.01); *G06K 15/1872* (2013.01)

(58) Field of Classification Search
CPC ........ B41J 2/04508; B41J 2/01; B41J 2/2132; B41J 2/2135; B41J 2/2146; B41J 5/30;
(Continued)

(56) References Cited

U.S. PATENT DOCUMENTS 8,391,585 B2 * 3/2013 Kuchii ...................... G06T 5/20
                                                              382/141
2009/0316164 A1     12/2009 Takahashi et al.
(Continued)

FOREIGN PATENT DOCUMENTS

| | | |
|---|---|---|
| JP | H09-030093 | 2/1997 |
| JP | H10-000764 A | 1/1998 |
| JP | 2004-181828 A | 7/2004 |
| JP | 2009-226703 A | 10/2009 |
| JP | 2010-000736 A | 1/2010 |
| JP | 2015-228012 A | 12/2015 |

OTHER PUBLICATIONS

Extended European Search Report for EP24179784.4 mailed on Oct. 31, 2024.

*Primary Examiner* — Anh T Vo
(74) *Attorney, Agent, or Firm* — IPUSA, PLLC

(57)          ABSTRACT

A liquid discharge apparatus includes a conveyor, a liquid discharge unit, a reader, and circuitry. The conveyor conveys a recording medium in a conveyance direction. The liquid discharge unit forms an image on the recording medium. The reader reads the image. The circuitry causes the liquid discharge unit to form a mark image on the recording medium, causes the reader to read the mark image to obtain read information, corrects an image to be formed based on the read information, and causes the liquid discharge unit to form the image, corrected based on the read information, on the recording medium. The mark image includes a first mark image including two or more vertical lines extending in the conveyance direction and two or more horizontal lines extending in a width direction. Each of the two or more vertical lines intersects or contacts each of the two or more horizontal lines.

15 Claims, 8 Drawing Sheets

(51) Int. Cl.
*G06K 15/02*     (2006.01)
*G06K 15/10*     (2006.01)

(58) Field of Classification Search
CPC ......... B41J 11/00; B41J 11/004; B41J 11/007;
B41J 11/0095; B41J 11/44; B41J 11/46;
B41J 13/00; B41J 19/18; B41J 19/20;
B41J 2029/3935; G06K 3/00; G06K
15/027; G06K 15/102; G06K 3/1872;
H04N 1/0057
See application file for complete search history.

(56)                References Cited

U.S. PATENT DOCUMENTS

| | | | |
|---|---|---|---|
| 2015/0070732 A1 | 3/2015 | Kishi et al. | |
| 2018/0141329 A1 | 5/2018 | Aoyagi et al. | |
| 2019/0166271 A1* | 5/2019 | Yamazaki | ................ B65H 7/02 |
| 2019/0285980 A1* | 9/2019 | Yoshikawa | ............... G03F 1/84 |
| 2020/0021693 A1 | 1/2020 | Kurabayashi | |
| 2020/0023649 A1 | 1/2020 | Fukuda | |
| 2020/0174716 A1* | 6/2020 | Harada | ..................... G06T 3/40 |
| 2020/0286218 A1* | 9/2020 | Ikeda | ..................... G06T 7/136 |
| 2023/0126430 A1 | 4/2023 | Kawashima | |
| 2023/0302834 A1 | 9/2023 | Kurabayashi et al. | |

* cited by examiner

Figure 8:
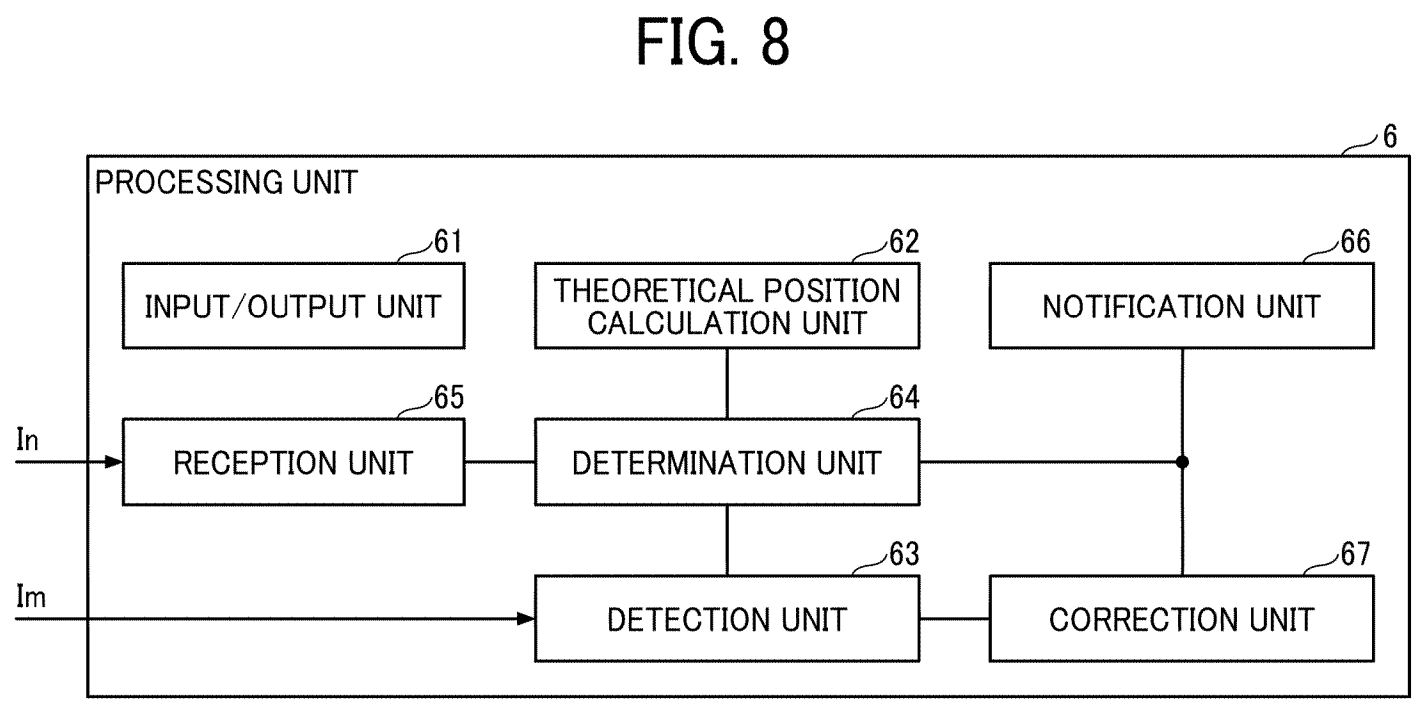

PROCESSING UNIT 6

INPUT/OUTPUT UNIT 61

THEORETICAL POSITION CALCULATION UNIT 62

NOTIFICATION UNIT 66

RECEPTION UNIT 65

DETERMINATION UNIT 64

DETECTION UNIT 63

CORRECTION UNIT 67

In

Im

FIG. 10
DETECTION RESULT OF SECOND MARK IMAGE
THEORETICAL VALUE   12.00, 40.25, 82.50, 124.75, 166.00, 208.25, 236.50, 264.75, 293.00, 321.25 [mm]
DETECTED VALUE        11.97, 40.20, 82.44, 124.60, 165.77, 207.62, 235.22, 264.00, 292.50, 322.00 [mm]
101a
FIG. 11
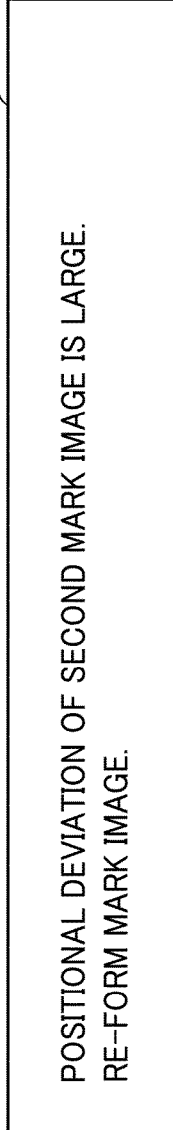
POSITIONAL DEVIATION OF SECOND MARK IMAGE IS LARGE.
RE-FORM MARK IMAGE.
101b
FIG. 12
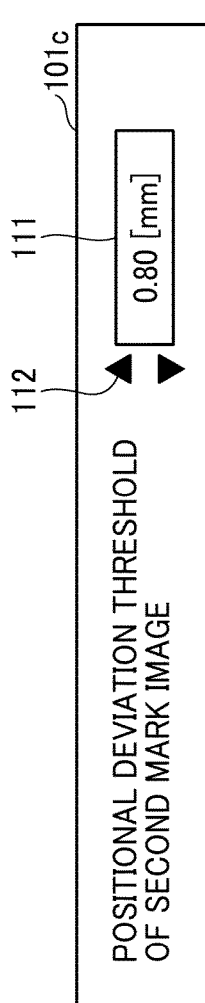
POSITIONAL DEVIATION THRESHOLD
OF SECOND MARK IMAGE
0.80 [mm]
112    111
101c

LIQUID DISCHARGE APPARATUS AND LIQUID DISCHARGE METHOD

CROSS-REFERENCE TO RELATED APPLICATION

This patent application is based on and claims priority pursuant to 35 U.S.C. § 119 (a) to Japanese Patent Application No. 2023-092417, filed on Jun. 5, 2023, in the Japan Patent Office, the entire disclosure of which is hereby incorporated by reference herein.

BACKGROUND

Technical Field

Embodiments of the present disclosure relate to a liquid discharge apparatus and a liquid discharge method.

Related Art

In the related art, a technique is known in which a liquid discharge apparatus forms an image on a recording medium, reads the image formed on the recording medium, and corrects an image to be formed on another recording medium based on the result of reading.

SUMMARY

Embodiments of the present disclosure describe an improved liquid discharge apparatus that includes a conveyor, a liquid discharge unit, a reader, and circuitry. The conveyor conveys a recording medium in a conveyance direction. The liquid discharge unit forms an image on the recording medium conveyed to the liquid discharge unit by the conveyor. The reader reads the image formed on the recording medium by the liquid discharge unit. The circuitry causes the liquid discharge unit to form a mark image on the recording medium. The mark image includes a first mark image including two or more vertical lines extending in the conveyance direction and two or more horizontal lines extending in a width direction intersecting the conveyance direction. Each of the two or more vertical lines intersects or contacts each of the two or more horizontal lines. The circuitry further causes the reader to read the mark image on the recording medium to obtain read information of the mark image, corrects an image to be formed on the recording medium based on the read information, and causes the liquid discharge unit to form the image corrected based on the read information on the recording medium.

According to another embodiment of the present disclosure, there is provided a liquid discharge method including conveying a recording medium in a conveyance direction, forming an image on the recording medium conveyed, reading the image formed on the recording medium, forming a mark image on the recording medium, reading the mark image on the recording medium to obtain read information, correcting an image to be formed on the recording medium based on the read information, and forming the image corrected based on the read information on the recording medium. The mark image includes a first mark image including two or more vertical lines extending in the conveyance direction and two or more horizontal lines extending in a width direction intersecting the conveyance direction on the recording medium. Each of the two or more vertical lines intersects or contacts each of the two or more vertical lines.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a schematic diagram illustrating an overall configuration of a liquid discharge apparatus according to a first embodiment of the present disclosure;

FIG. 8 is a block diagram illustrating a functional configuration of a processing unit of the liquid discharge apparatus of FIG. 1, according to the first embodiment;

FIG. 10 is a diagram illustrating a display screen of a detection result of second mark images by a display of the liquid discharge apparatus of FIG. 1;

FIG. 11 is a diagram illustrating a display screen of notification by the display of the liquid discharge apparatus of FIG. 1;

FIG. 12 is a diagram illustrating a display screen of a positional deviation threshold by the display of the liquid discharge apparatus of FIG. 1.

Figure 2:
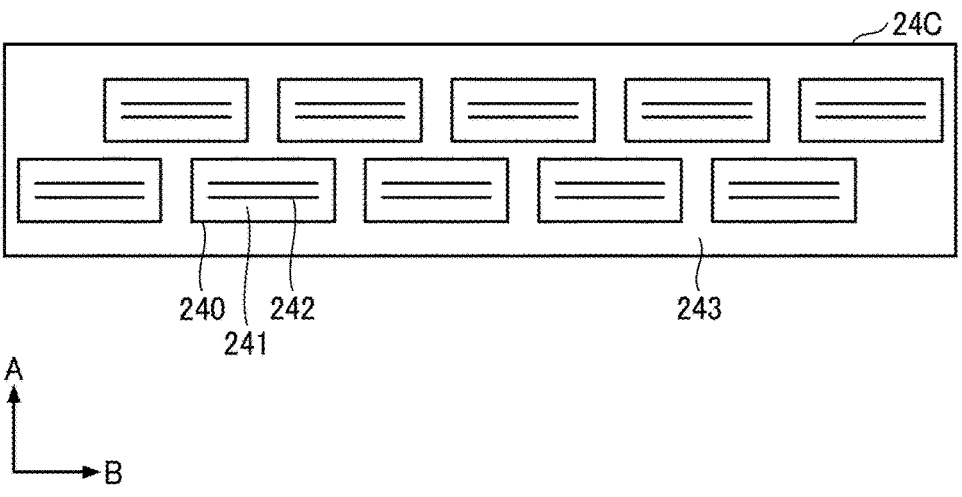
FIG. 2 is a schematic diagram of a head unit of the liquid discharge apparatus of FIG. 1, according to the first embodiment, as viewed in the normal direction of a nozzle plate of the head unit.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liquid discharge apparatus and a liquid discharge method according to an embodiment of the present disclosure are described below with reference to the drawings. However, embodiments described below are some examples of the liquid discharge apparatus and the liquid discharge method for embodying the technical idea of the present disclosure, and embodiments of the present disclosure are not limited to the embodiments described below. For example, the size and positional relationship of components illustrated in the drawings may be exaggerated for clarity of description. In the following description, like names and like reference signs denote like or equivalent components, and a detailed description thereof may be omitted as appropriate.

In the following drawings, a recording medium according to the present embodiment is conveyed in a conveyance direction A indicated by arrow A which is directed toward +A side, and the opposite side relative to the +A side is referred to as −A side. Further, a width direction B of the recording medium intersecting the conveyance direction A is indicated by arrow B which is directed toward +B side, and the opposite side relative to the +B side is referred to as −B side.

The term "image" in this specification may refer to both an "image" formed (or to be formed) on the recording medium according to the present embodiment and an "image" in read information read by a reader according to the present embodiment. Which of the image formed on the recording medium or the image in the read information is indicated by the term "image" can be appropriately distinguished according to the context.

First Embodiment

Configuration of Liquid Discharge Apparatus According to First Embodiment

Figure 1:
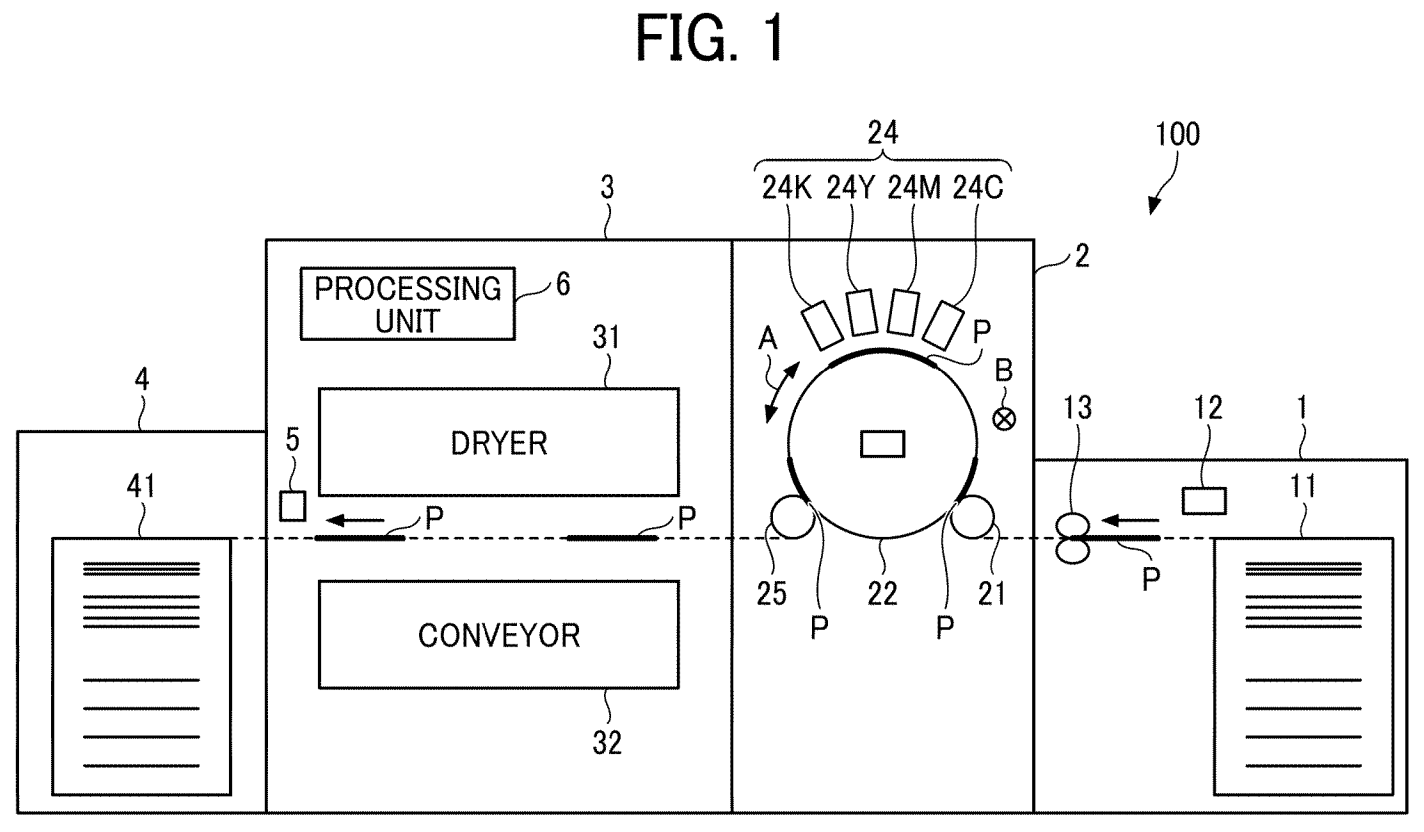

FIG. 1 is a schematic diagram illustrating the overall configuration of a liquid discharge apparatus 100 according to the present embodiment. FIG. 1 schematically illustrates the interior of the liquid discharge apparatus 100 as viewed from −B side in the width direction B. The liquid discharge apparatus 100 can form an image on a recording medium P conveyed in the conveyance direction A. The liquid discharge apparatus 100 is, for example, an image forming apparatus for commercial printing that forms a desired image on a large number of recording media P such as sheets by a liquid discharge method.

In the example illustrated in FIG. 1, the liquid discharge apparatus 100 includes a recording medium P on which a mark image is formed by the liquid discharge apparatus 100, a reader 5 that reads an image formed on the recording medium P, and a processing unit 6. The processing unit 6 includes a correction unit that corrects an image to be formed on the recording medium P based on read information read by the reader 5. Examples of the correction by the correction unit include correction of the position of an image to be formed on the recording medium P by the liquid discharge apparatus 100 and correction of the density of an image to be formed on the recording medium P. The liquid discharge apparatus 100 uses the mark image formed on the recording medium P by the liquid discharge apparatus 100 for the correction by the correction unit.

The recording medium P on which the mark image is formed is a so-called test chart used for detecting the position and the density of an image formed on the recording medium P by the liquid discharge apparatus 100. The liquid discharge apparatus 100 detects the position of the mark image based on the read information of the mark image in the test chart. The liquid discharge apparatus 100 can correct the position and the density of an image to be formed on the recording medium P based on the detected position of the mark image.

For example, a liquid discharge apparatus that forms an image on a recording medium conveyed in the conveyance direction A may form a noise image such as a vertical streak image including a vertical line extending in the conveyance direction A (may be referred to simply as a vertical line in the following description) or a horizontal streak image including a horizontal line extending in the width direction B (may be referred to simply as a horizontal line in the following description) on the recording medium. If the mark image is formed of a simple image such as an image of only a vertical line or an image of only a horizontal line, the correction unit may erroneously detect a noise image formed on the recording medium P as the mark image, and thus the correction accuracy of the image may be lowered. When the correction accuracy of the image is lowered, the quality of the image formed on the recording medium by the liquid discharge apparatus is lowered.

As described in detail later with reference to FIGS. 4 to 7, the mark image according to the present embodiment includes a first mark image including two or more vertical lines extending in the conveyance direction A and two or more horizontal lines extending in the width direction B intersecting the conveyance direction A. Each of the two or more vertical lines intersects or contacts each of the two or more horizontal lines. For example, the first mark image includes three vertical lines extending in the conveyance direction A and three horizontal lines extending in the width direction B. Each of the three horizontal lines intersects or contacts each of the three vertical lines. The first mark image has a large difference in shape from the vertical streak image or the horizontal streak image as compared with a mark image formed of only a vertical line or horizontal line. Due to the difference in shape, the liquid discharge apparatus 100 is unlikely to erroneously detect a noise image as the mark image. Accordingly, the correction accuracy by the correction unit can be increased, and the quality of an image formed on the recording medium P by the liquid discharge apparatus 100 can be enhanced.

As illustrated in FIG. 1, the liquid discharge apparatus 100 includes a sheet feeding device 1, an image forming device 2, a drying device 3, and a sheet output device 4. The liquid discharge apparatus 100 forms an image on a recording medium P fed from the sheet feeding device 1 by the image forming device 2 using ink as a liquid for image formation. After the drying device 3 dries the ink adhering to the recording medium P, the recording medium P is output in the sheet output device 4. The recording medium P is a recording material as a sheet material, and is, for example, a cut sheet cut into a predetermined size.

Sheet Feeding Device

The sheet feeding device 1 includes a sheet feeding tray 11 on which a plurality of recording media P is stacked, a feeder 12 that separates and feeds the recording media P one by one from the sheet feeding tray 11, and a registration roller pair 13 that feeds the recording media P to the image forming device 2. Any feeder such as a device using a roller or a device using air suction may be used as the feeder 12. After the leading end of the recording medium P fed from the sheet feeding tray 11 by the feeder 12 reaches the registration roller pair 13, the registration roller pair 13 is driven at a predetermined timing to feed the recording medium P to the image forming device 2. In the present embodiment, the configuration of the sheet feeding device 1 is not limited to any particular configuration as long as the sheet feeding device 1 can feed the recording medium P to the image forming device 2.

Image Forming Device

The image forming device 2 includes a receiving cylinder 21, a bearing drum 22, a liquid discharge unit 24, and a transfer cylinder 25. The receiving cylinder 21 receives the fed recording medium P. The bearing drum 22, which serves as a conveyor, carries the recording medium P conveyed by the receiving cylinder 21 on the outer circumferential surface of the bearing drum 22 to convey the recording medium P in the conveyance direction A. The liquid discharge unit 24 discharges ink toward the recording medium P carried by the bearing drum 22. The transfer cylinder 25 delivers the recording medium P carried by the bearing drum 22 to the drying device 3. The leading end of the recording medium P fed from the sheet feeding device 1 to the image forming device 2 is gripped by a sheet gripper disposed on the surface of the receiving cylinder 21, and the recording medium Pis conveyed along with the movement of the surface of the receiving cylinder 21. The receiving cylinder 21 forwards the recording medium P to the bearing drum 22 at a position opposite the bearing drum 22. The width direction B is substantially orthogonal to the conveyance direction A.

Similarly to the receiving cylinder 21, the bearing drum 22 includes a gripper on the surface thereof, and the leading end of the recording medium Pis gripped by the gripper. Multiple suction holes are dispersedly formed on the surface of the bearing drum 22. A suction device generates a suction airflow toward the inside of the bearing drum 22 through the suction holes. The gripper grips the leading end of the recording medium P transferred from the receiving cylinder 21 to the bearing drum 22, and the recording medium Pis sucked onto the surface of the bearing drum 22 by the suction airflow. The recording medium Pis conveyed along with the movement of the surface of the bearing drum 22.

The liquid discharge unit 24 according to the present embodiment discharges liquids of four colors of C (cyan), M (magenta), Y (yellow), and K (black) to form an image. The liquid discharge unit 24 includes head units 24C, 24M, 24Y, and 24K which are provided individually for the respective colors of the liquids. The configuration of the head units 24C, 24M, 24Y, and 24K is not limited to any particular configuration and may be any configuration that can discharge a liquid. In some embodiments, the liquid discharge unit 24 may include a head unit that discharges special ink such as white, gold, and silver or a head unit that discharges, for example, a surface coating liquid that does not form an image.

A discharge operation of each of the head units 24C, 24M, 24Y, and 24K is controlled by a drive signal corresponding to image data. When the recording medium P borne on the bearing drum 22 passes through a region facing the liquid discharge unit 24, the liquids of respective colors are discharged from the head units 24C, 24M, 24Y, and 24K, and an image corresponding to the image data is formed on the recording medium P. In the present embodiment, the configuration of the image forming device 2 is not limited to any particular configuration as long as an image is formed by applying a liquid onto the recording medium P.

Drying Device

The drying device 3 includes a dryer 31 and a conveyor 32. The dryer 31 dries ink adhered to the recording medium P by the image forming device 2. The conveyor 32 conveys the recording medium P conveyed from the image forming device 2. The recording medium P conveyed from the image forming device 2 is received by the conveyor 32, then conveyed so as to pass through the dryer 31, and delivered to the sheet output device 4. When the recording medium P passes through the dryer 31, ink on the recording medium P is subjected to a drying process. Accordingly, liquid components such as moisture in the ink are evaporated, the ink is fixed on the recording medium P, and curling of the recording medium P is prevented.

Sheet Output Device

The sheet output device 4 includes an output tray 41 on which a plurality of recording media P is stacked. The recording medium P conveyed from the drying device 3 is sequentially stacked and held on the output tray 41. In the present embodiment, the configuration of the sheet output device 4 is not limited to any particular configuration and may be any configuration that can stack the recording medium P ejected from the drying device 3.

Reader

The reader 5 reads an image formed on the recording medium P. The reader 5 reads, for example, a mark image formed on the recording medium P by the liquid discharge apparatus 100. The reader 5 can further read a rectangular image formed by the liquid discharge apparatus 100. The rectangular image having a predetermined density extends in the width direction B on the recording medium P.

The reader 5 is disposed near the exit of the dryer 31 in the drying device 3. The reader 5 can read the image formed on the recording medium P after the recording medium P is dried by the dryer 31. However, the position of the reader 5 is not limited to the position illustrated in FIG. 1 as long as the reader 5 can read the image formed on the recording medium P. For example, the reader 5 may be disposed between the bearing drum 22 and the conveyor 32, or may be disposed in the sheet output device 4.

The reader 5 includes an in-line sensor that reads a mark image formed on the recording medium P being conveyed. The inline sensor includes a one-dimensional imaging element formed of, for example, a charge-coupled device (CCD) or a complementary metal-oxide-semiconductor (CMOS). In the one-dimensional imaging element, pixels are linearly arrayed in the width direction B. The reader 5 captures an image of the recording medium P being conveyed in the conveyance direction A with the one-dimensional imaging element in which pixels are arrayed in the width direction B to obtain read information of the recording medium P as two-dimensional image data. The reader 5 can output the obtained read information to the processing unit 6.

Other Functional Devices

The liquid discharge apparatus 100 may further include other functional devices as appropriate in addition to the sheet feeding device 1, the image forming device 2, the drying device 3, the sheet output device 4, and the reader 5. Examples of the other functional devices include a pretreatment device and an aftertreatment device. The pretreatment device is disposed between the sheet feeding device 1 and the image forming device 2 and performs pretreatment for image formation on the recording medium P. The aftertreatment device is disposed between the drying device 3 and the sheet output device 4 and performs aftertreatment of image formation on the recording medium P.

For example, the pretreatment unit applies a pretreatment liquid, which reacts with ink, to the recording medium P to reduce bleeding of the ink. However, there is no particular limitation on the content of the pretreatment performed by the pretreatment device. Examples of the aftertreatment device include a reverse conveyance mechanism for reversing the recording medium P on which an image has been formed by the image forming device 2 and sending the recording medium P to the image forming device 2 again to form images on both sides of the recording medium P, a post-processing mechanism for binding a plurality of recording media P on which images have been formed, a correction mechanism for correcting deformation of the recording medium P, and a cooling mechanism for cooling the recording medium P. However, there is no particular limitation on the content of the aftertreatment performed by the aftertreatment device.

Head Unit

The configuration of the head unit 24C included in the liquid discharge unit 24 illustrated in FIG. 1 will be described below with reference to FIG. 2. FIG. 2 is a schematic diagram of the head unit 24C as viewed in a direction normal to a nozzle plate 241 of a discharge head 240 included in the head unit 24C. The head units 24M, 24Y, and 24K included in the liquid discharge unit 24 have the same configuration as the head unit 24C except that the colors of liquids to be discharged are different. The head unit 24C will be described below as a representative.

In the example illustrated in FIG. 2, the head unit 24C is a full-line type head unit in which ten discharge heads 240 are arranged on a base 243. The ten discharge heads 240 are arranged in the width direction B so as to form an image within a predetermined range in the width direction B of the recording medium P being conveyed in the conveyance direction A. The ten discharge heads 240 are arranged in two rows in the conveyance direction A. Five discharge heads 240 are arranged in the width direction B in each of the two rows. The positions of the discharge heads 240 in the two rows are shifted from each other in the width direction B.

By these arrangements, the head unit 24C can form an image in the entire recording medium P in the width direction B without a gap even at the boundary between the discharge heads 240 arranged in the width direction B.

The number of the discharge heads 240 included in the head unit 24C is not limited to ten, and can be changed as appropriate according to, for example, the length of the recording medium P in the width direction B. The number of rows of the discharge heads 240 arranged in the conveyance direction A is not limited to two, and may be one or more. Further, the respective rows of the discharge heads 240 arranged in the conveyance direction A may not necessarily be shifted from each other in the width direction B.

Each of the ten discharge heads 240 includes the nozzle plate 241 and multiple nozzles 242. The nozzle plate 241, which forms a part of a storage portion in which liquid is stored, faces the bearing drum 22 (refer to FIG. 1). Each of the multiple nozzles 242 may be a through hole formed in the nozzle plate 241. The multiple nozzles 242 are arranged in the width direction B to form a nozzle row. In FIG. 2, the multiple nozzles 242 forming the nozzle row are simplified and represented by lines extending in the width direction B.

The discharge head 240 discharges the liquid stored in the storage portion toward the recording medium P carried by the bearing drum 22 through the nozzles 242. The liquid discharge apparatus 100 can discharge the liquid onto a predetermined range of the recording medium P in the width direction B by the multiple nozzles 242 included in each of the ten discharge heads 240.

The discharge operation of each of the head units 24C, 24M, 24Y, and 24K is controlled by a drive signal corresponding to information on image formation. When the recording medium P borne on the bearing drum 22 passes through a region facing the liquid discharge unit 24, the liquids of respective colors are discharged from the head units 24C, 24M, 24Y, and 24K. Thus, the liquid discharge apparatus 100 can form an image corresponding to the image data on the recording medium P.

Hardware Configuration

Figure 3:
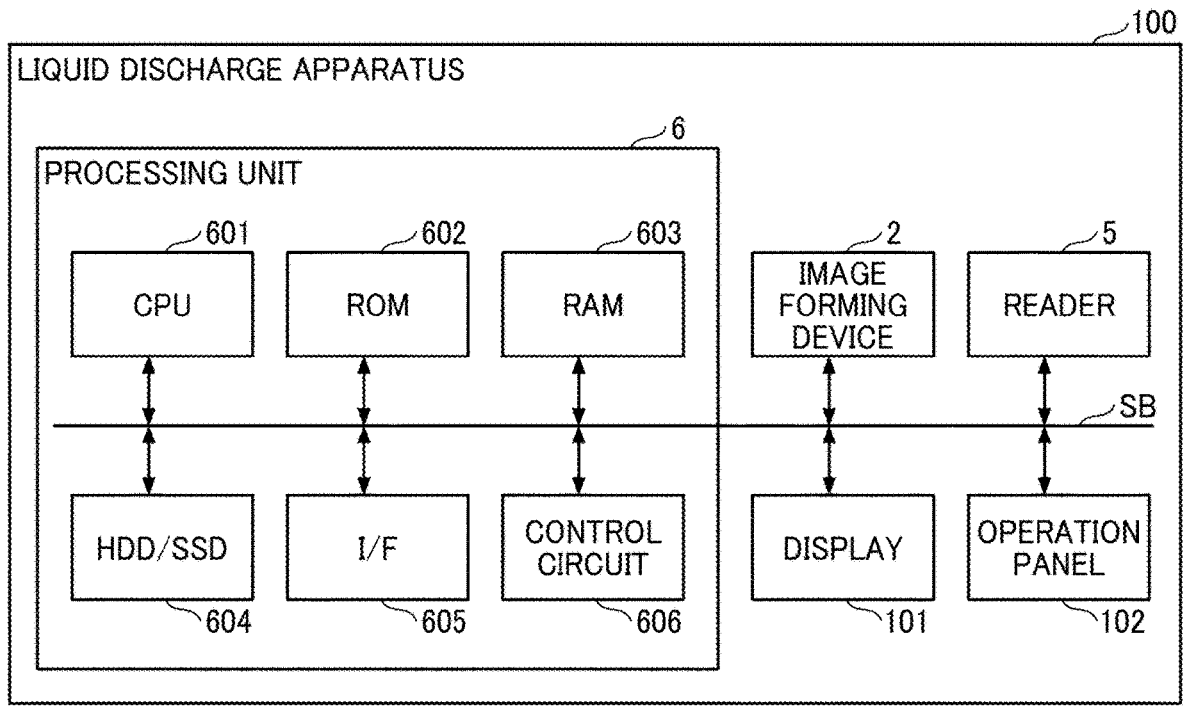
FIG. 3 is a block diagram illustrating a hardware configuration of the liquid discharge apparatus of FIG. 1, according to the first embodiment.

FIG. 3 is a block diagram illustrating an example of an electrical hardware configuration of the liquid discharge apparatus 100. In the example illustrated in FIG. 3, the liquid discharge apparatus 100 includes the image forming device 2, the reader 5, the processing unit 6, a display 101, and an operation panel 102. The processing unit 6 includes a central processing unit (CPU) 601, a read-only memory (ROM) 602, a random-access memory (RAM) 603, a hard disk drive/solid-state drive (HDD/SSD) 604, an interface (I/F) 605, and a control circuit 606. The components illustrated in FIG. 3 are connected to each other via a system bus SB so as to communicate with each other.

The processing unit 6 controls the overall operation of the liquid discharge apparatus 100. The image forming device 2 is an image forming engine for forming an image on the recording medium P as described above. The display 101 displays messages such as notifications and warnings on a display screen. The display 101 may include a liquid crystal panel or an organic electroluminescence (EL) display panel.

The CPU 601 uses the RAM 603 as a work area and executes processing defined in a program stored in the ROM 602. The HDD/SSD 604 is used as a memory and stores setting values set in advance. The CPU 601 may read information stored in the HDD/SSD 604 and use the information to execute a program.

The I/F 605 is an interface that enables the liquid discharge apparatus 100 and an external device to communicate with each other. The I/F 605 enables the liquid discharge apparatus 100 to communicate with, for example, an external server via the Internet. The control circuit 606 is an electric circuit or an electronic circuit that performs, for example, control or arithmetic processing with high-speed processing.

Examples of Mark Image and Rectangular Image

Figure 4:
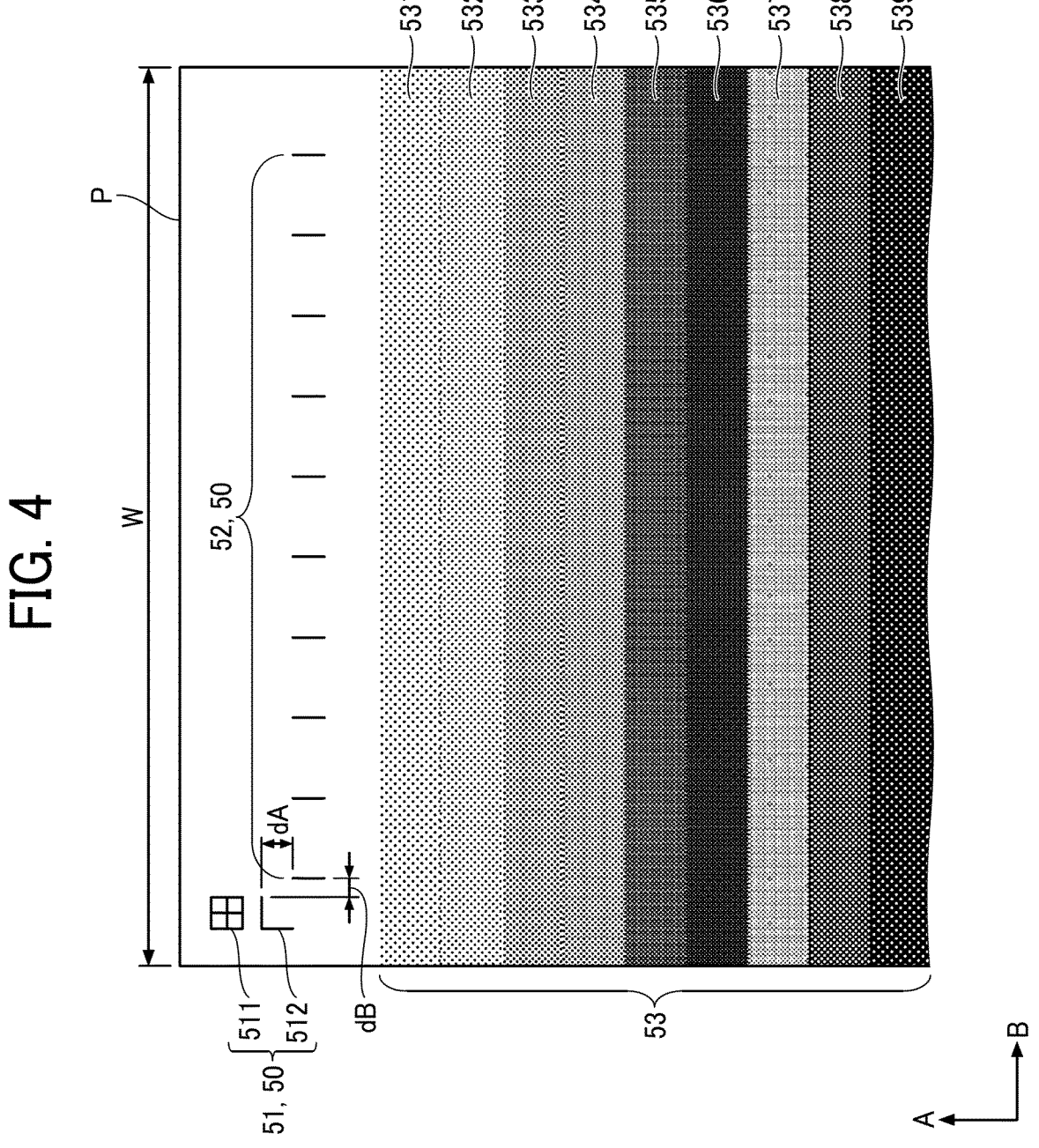
FIG. 4 is a diagram illustrating a recording medium on which mark images and rectangular images are formed by the liquid discharge apparatus of FIG. 1, according to the first embodiment.
Figure 5:
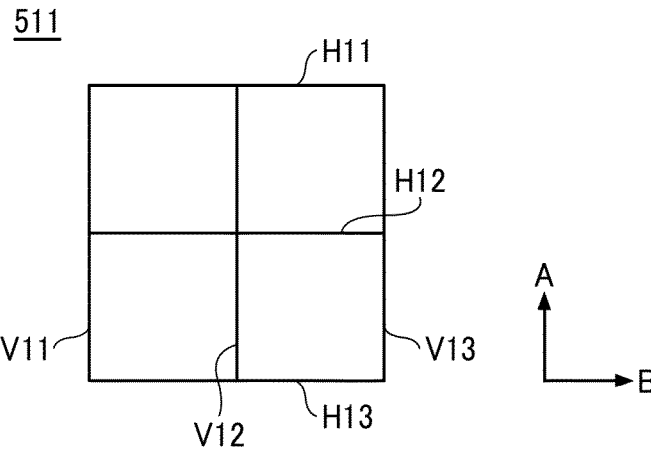
FIG. 5 is an enlarged diagram of a first example of a first mark image of the mark image in FIG. 4.
Figure 6:
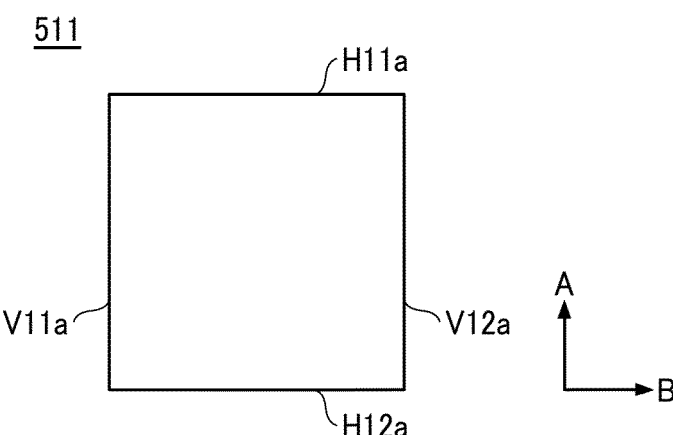
FIG. 6 is an enlarged diagram of a second example of the first mark image in FIG. 4.
Figure 7:
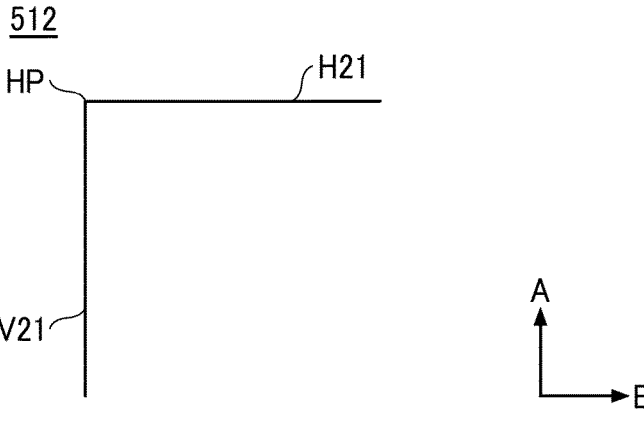
FIG. 7 is an enlarged diagram of a second image of the first mark image in FIG. 4.

The mark image and the rectangular image according to the first embodiment will be described below with reference to FIGS. 4 to 7. FIG. 4 is a diagram illustrating a recording medium P on which mark images and rectangular images are formed according to the first embodiment. FIG. 5 is an enlarged diagram of a first example of the first mark image in FIG. 4. FIG. 6 is an enlarged diagram of a second example of the first mark image in FIG. 4. FIG. 7 is an enlarged diagram of an example of a second image of the first mark image in FIG. 4.

FIG. 4 illustrates a part of the recording medium P viewed in a direction substantially orthogonal to each of the conveyance direction A and the width direction B. FIGS. 5 to 7 illustrate the mark images viewed in a direction orthogonal to each of the conveyance direction A and the width direction B.

As illustrated in FIG. 4, a mark image 50 includes a first mark image 51. The mark image 50 may include multiple second mark images 52 and multiple rectangular images 53.

The first mark image 51 may include a first image 511 and a second image 512. The recording medium P has a width W in the width direction B. The width W corresponds to a predetermined range of the recording medium P in the width direction B.

In the example illustrated in FIGS. 4 and 5, the first image 511 includes three vertical lines V11, V12, and V13 extending in the conveyance direction A, and three horizontal lines H11, H12, and H13 extending in the width direction B. Each of the three horizontal lines H11, H12, and H13 intersects or contacts each of the three vertical lines V11, V12, and V13. The first image 511 is arranged at the corner on the +A side and the −B side of the recording medium P.

The first image 511 is not limited to the images illustrated in FIGS. 4 and 5, and may include two or more vertical lines extending in the conveyance direction A and two or more horizontal lines extending in the width direction B. Each of the two or more horizontal lines intersects or contacts each of the two or more vertical lines. For example, as illustrated in FIG. 6, the first image 511 may include two vertical lines V11a and V12a extending in the conveyance direction A, and two horizontal lines H11a and H12a extending in the width direction B. Each of the two horizontal lines H11a and H12a intersects or contacts each of the two vertical lines V11a and V12a.

As illustrated in FIG. 4, the second image 512 is formed within a predetermined distance from the first image 511. As illustrated in FIGS. 4 and 7, the second image 512 includes one vertical line V21 extending in the conveyance direction A and one horizontal line H21 extending in the width direction B. The second image 512 may include a reference position HP where the one vertical line V21 and the one horizontal line H21 intersect or contact with each other. The mark image 50 includes the second image 512 to set the reference position HP for the second mark image 52. The predetermined distance is not limited to a particular distance as long as the second image 512 can be detected after the first image 511 is detected. However, from the viewpoint of reducing erroneous detection of a noise image, it is preferable that the predetermined distance is short, i.e., the first image 511 and the second image 512 are formed as close as possible.

In the example illustrated in FIG. 4, the second mark image 52 is a vertical line extending in the conveyance direction A. Ten second mark images 52 are arranged in the width direction B. The positions of the ten second mark images 52 indicate positions of boundaries of the ten discharge heads 240 illustrated in FIG. 2. For example, the position of the boundary of each of the ten discharge heads 240 corresponds to the position of the reference nozzle on the most −B side among the multiple nozzles 242 included in each of the ten discharge heads 240 in FIG. 2 in the width direction B. However, the reference nozzle is not limited to the nozzle on the most −B side among the multiple nozzles 242, and may be the nozzle on the most +B side.

The reference position HP of the first mark image 51 is associated with each of the positions of the ten second mark images 52 in advance. The liquid discharge apparatus 100 detects the relative position of each of the ten second mark images 52 with respect to the reference position HP based on the position of the reference position HP in read information Im read by the reader 5 to specify the position of the boundary of each of the ten discharge heads 240. The liquid discharge apparatus 100 can specify the positions of all of the multiple nozzles 242 in the width direction B. The multiple nozzles 242 are arranged at predetermined positions with respect to the positions of the boundaries of the ten discharge heads 240.

The rectangular image 53 extending in the width direction B is formed on the recording medium P by the liquid discharge apparatus 100. If there is no difference in density between images formed by the multiple nozzles 242 included in the ten discharge heads 240, the rectangular image 53 has almost no density distribution and a substantially uniform density. However, for example, when the discharge amount of liquid according to the drive signal is different for each of the multiple nozzles 242, a density difference occurs in the image formed on the recording medium P by the multiple nozzles 242. Due to the density difference, for example, a vertical streak extending in the conveyance direction A may be visually recognized in the rectangular image 53.

The liquid discharge apparatus 100 specifies the positions corresponding to the multiple nozzles 242 in the rectangular image 53 based on the read information Im of the mark image 50 to specify the nozzle 242 causing the density difference. The liquid discharge apparatus 100 corrects the discharge amount of liquid discharged from the nozzle 242 causing the density difference so that the density is not different from the density of the image formed by the other nozzles 242. As a result, the density difference in the image formed on the recording medium P can be reduced, and a high-quality image can be formed.

On the other hand, for example, when the second image 512 is directly detected in the read information Im without via the first image 511, a noise image may be erroneously detected as the second image 512 due to the shape of the second image 512 similar to the noise image such as the vertical streak image or the horizontal streak image. With such erroneous detection, the reference position HP may not be detected with high accuracy, and an image may not be corrected with high accuracy.

The liquid discharge apparatus 100 detects the first image 511 from the read information Im read by the reader 5, then detects the second image 512 arranged at a predetermined position with respect to the first image 511, and specifies the reference position HP. Then, after specifying the positions of the second mark images 52 based on the reference position HP, the liquid discharge apparatus 100 specifies the positions of all of the multiple nozzles 242. The liquid discharge apparatus 100 detects the second image 512 via the first image 511 having a shape greatly different from that of the noise image to reduce erroneous detection of the second image 512. As a result, the reference position HP can be detected with high accuracy, and the image can be corrected with high accuracy.

As illustrated in FIG. 4, the rectangular image 53 may include nine rectangular images 531 to 539 formed side by side in the conveyance direction A. The nine rectangular images 531 to 539 have densities different from each other. For example, the density difference of the image may be different in visibility depending on the density of the formed image. Since the density difference of the image can be detected at various densities in the nine rectangular images 531 to 539 having densities different from each other. As a result, the detection accuracy of the density difference can be increased, and the correction accuracy of the density of the image can be increased. The number of rectangular images 53 is not limited to nine, and may be one or more. The number of rectangular images 53 can be determined as appropriate according to, for example, a desired correction accuracy.

The second image 512 of the first mark image 51 and the second mark image 52 may be separated from each other by a predetermined distance or more in at least one of the conveyance direction A or the width direction B on the recording medium P. In the example illustrated in FIG. 4, the second image 512 and the second mark image 52 are separated from each other by a distance dA in the conveyance direction A and by a distance dB in the width direction B. The second image 512 and the second mark image 52 separated from each other on the recording medium P can prevent the overlap between the second image 512 and the second mark image 52, can reduce erroneous detection between the second image 512 and the second mark image 52, and can increase the detection accuracy of the positions of the second image 512 and the second mark image 52.

The arrangement of the first image 511, the second image 512, the multiple second mark images 52, and the multiple rectangular images 53 on the recording medium P can be changed as appropriate. For example, the first image 511 and the second image 512 may be arranged at the center of the recording medium P in the width direction B, or may be arranged at the corner on the +A side and the +B side.

Functional Configuration of Processing Unit

A functional configuration of the processing unit 6 will be described below. FIG. 8 is a block diagram illustrating an example of a functional configuration of the processing unit 6. In the example illustrated in FIG. 8, the processing unit 6 includes a correction unit 67. The processing unit 6 may include an input/output unit 61, a theoretical position calculation unit 62, a detection unit 63, a determination unit 64, a reception unit 65, and a notification unit 66.

For example, the functions of the theoretical position calculation unit 62, the detection unit 63, the determination unit 64, the notification unit 66, and the correction unit 67 can be implemented by the CPU 601, illustrated in FIG. 3, executing processing defined in a program stored in the ROM 602, or by the control circuit 606. The functions of the input/output unit 61 and the reception unit 65 can be implemented by, for example, the I/F 605 illustrated in FIG. 3. Some of the functions of the processing unit 6 may be implemented by a configuration other than the processing unit 6, or may be implemented by distributed processing between the processing unit 6 and a configuration other than the processing unit 6. Examples of the configuration other than the processing unit 6 include an external server.

The input/output unit 61 controls communication with each of the image forming device 2, the display 101, the operation panel 102, and the reader 5 illustrated in FIG. 3 to transmit and receive information and signals to and from each component.

The theoretical position calculation unit 62 calculates the theoretical position of the mark image 50 formed on the recording medium P based on the size information of the recording media P. For example, the size information is received from the image forming device 2 or the operation panel 102 via the input/output unit 61 and indicates the size of the recording medium P such as A4 size and A3 size. For example, the theoretical position calculation unit 62 can calculate the theoretical position of each of the ten second mark images 52 in the mark image 50. The theoretical position calculation unit 62 transmits information on the calculated theoretical position of the mark image 50 to the determination unit 64.

The detection unit 63 detects the position of the mark image 50 formed on the recording medium P based on the read information Im read by the reader 5. The detection unit 63 receives the read information Im read by the reader 5 from the reader 5 via the input/output unit 61 and detects the position of each of the ten second mark images 52 with respect to the reference position HP based on the read information Im.

The determination unit 64 determines whether the amount of positional deviation (i.e., a positional deviation amount) of the mark image 50 from the theoretical position obtained based on the size information of the recording medium P is equal to or less than a predetermined positional deviation threshold.

For example, the determination unit 64 calculates the positional deviation amount of each of the second mark images 52 based on the theoretical positions of the ten second mark images 52 calculated by the theoretical position calculation unit 62 and the positions of the ten second mark images 52 detected by the detection unit 63. The determination unit 64 compares the calculated positional deviation amount with the positional deviation threshold. The determination unit 64 determines that the positional deviation amount of the mark image 50 from the theoretical position is equal to or less than the positional deviation threshold when all of the positional deviation amounts of the ten second mark images 52 from the theoretical position are equal to or less than the positional deviation threshold.

In a liquid discharge apparatus, when the position of the mark image formed on the recording medium P deviates from the theoretical position, the correction accuracy by the correction unit may be lowered. In the liquid discharge apparatus 100, when the determination unit 64 determines that the positional deviation amount is equal to or less than the positional deviation threshold, the correction unit 67 performs correction to prevent the correction accuracy from being lowered.

When the determination unit 64 determines that the positional deviation amount of the mark image 50 from the theoretical position is equal to or less than the positional deviation threshold, the determination unit 64 transmits the information regarding the position of each of the multiple nozzles 242 in the read information Im to the correction unit 67.

On the other hand, when the determination unit 64 determines that the positional deviation amount of the mark image 50 from the theoretical position is more than the positional deviation threshold, the determination unit 64 counts the number of times of consecutive determinations that the positional deviation amount is more than the positional deviation threshold. The "number of times of consecutive determinations" means the number of times of determinations performed repeatedly by the determination unit 64 when the liquid discharge apparatus 100 repeatedly performs a series of operations of detection by the detection unit 63 and determination by the determination unit 64.

Since the detection of the position of the mark image 50 by the detection unit 63 includes a certain degree of error, if the determination unit 64 determines that an error has occurred when the positional deviation amount is more than the positional deviation threshold in only one determination, the accuracy of error determination may be lowered. Examples of the error include an error in which a formation error of the mark image 50 on the recording medium P is large and an error in which a reading error of the mark image 50 by the reader 5 is large.

The liquid discharge apparatus 100 repeatedly performs the series of operations of detection by the detection unit 63 and determination by the determination unit 64, and the determination unit 64 determines an error when the number of times of consecutive determinations that the positional deviation is more than the positional deviation threshold reaches a threshold of a predetermined number of times of determinations. Accordingly, the accuracy of error determination can be increased.

The reception unit 65 receives a setting input In of the positional deviation threshold by an operator. For example, the reception unit 65 receives, via the input/output unit 61, the setting input In of the positional deviation threshold input by the operator using the operation panel 102 illustrated in FIG. 3. The reception unit 65 transmits the received setting input In to the determination unit 64. The determination unit 64 can change the positional deviation threshold in accordance with the received setting input In.

In the liquid discharge apparatus 100, the reception unit 65 receives the setting input In of the positional deviation threshold by the operator, and thus the positional deviation threshold is variable. Accordingly, the reliability of determination by the determination unit 64 using the positional deviation threshold can be enhanced. The reception unit 65 can also receive an operation input other than the setting input In of the positional deviation threshold by the operator.

The notification unit 66 indicates an error (e.g., notifies the operator of an error) when the number of times the determination unit 64 consecutively determines that the positional deviation amount of the mark image 50 from the theoretical position is more than the positional deviation threshold reaches the threshold of the predetermined number of times. For example, the notification unit 66 controls the operation of the display 101 illustrated in FIG. 3 via the input/output unit 61 to cause the display 101 to display information about an error so as to indicate the error. The notification unit 66 notifies the operator of an error, so that the liquid discharge apparatus 100 can prompt the operator of the liquid discharge apparatus 100 to re-form the mark image 50 on the recording medium P, to re-read the mark image 50 by the reader 5, or to adjust the image forming device 2.

In the liquid discharge apparatus 100, the display 101 can also display the positional deviation amount calculated by the determination unit 64. For example, the display 101 can display the positional deviation amount under the control of the notification unit 66 via the input/output unit 61. The display 101 displays the positional deviation amount, and thus the operator of the liquid discharge apparatus 100 can recognize the necessity of the re-formation of the mark image 50 on the recording medium P, the re-reading of the mark image 50 by the reader 5, or the adjustment of the image forming device 2.

The correction unit 67 corrects an image to be formed on the recording medium P by the liquid discharge apparatus 100 based on the read information Im read by the reader 5. The correction unit 67 corrects an image to be formed on the recording medium P when the determination unit 64 determines that the positional deviation amount of the mark image 50 from the theoretical position is equal to or less than the positional deviation threshold. The correction unit 67 can correct the density of the image to be formed by each of the multiple nozzles 242 based on the position of the mark image 50 and the density of the rectangular image 53 in the read information Im of the recording medium P.

When the rectangular image 53 has a density difference, the correction unit 67 may change the density of an image to be formed on the recording medium P by the liquid discharge apparatus 100 closer to the lowest density in the rectangular image 53 having the density difference. The correction unit 67 changes the density of the image closer to the lowest density to correct the image so as to reduce the density difference.

Example of Operation of Liquid Discharge Apparatus

Figure 9:
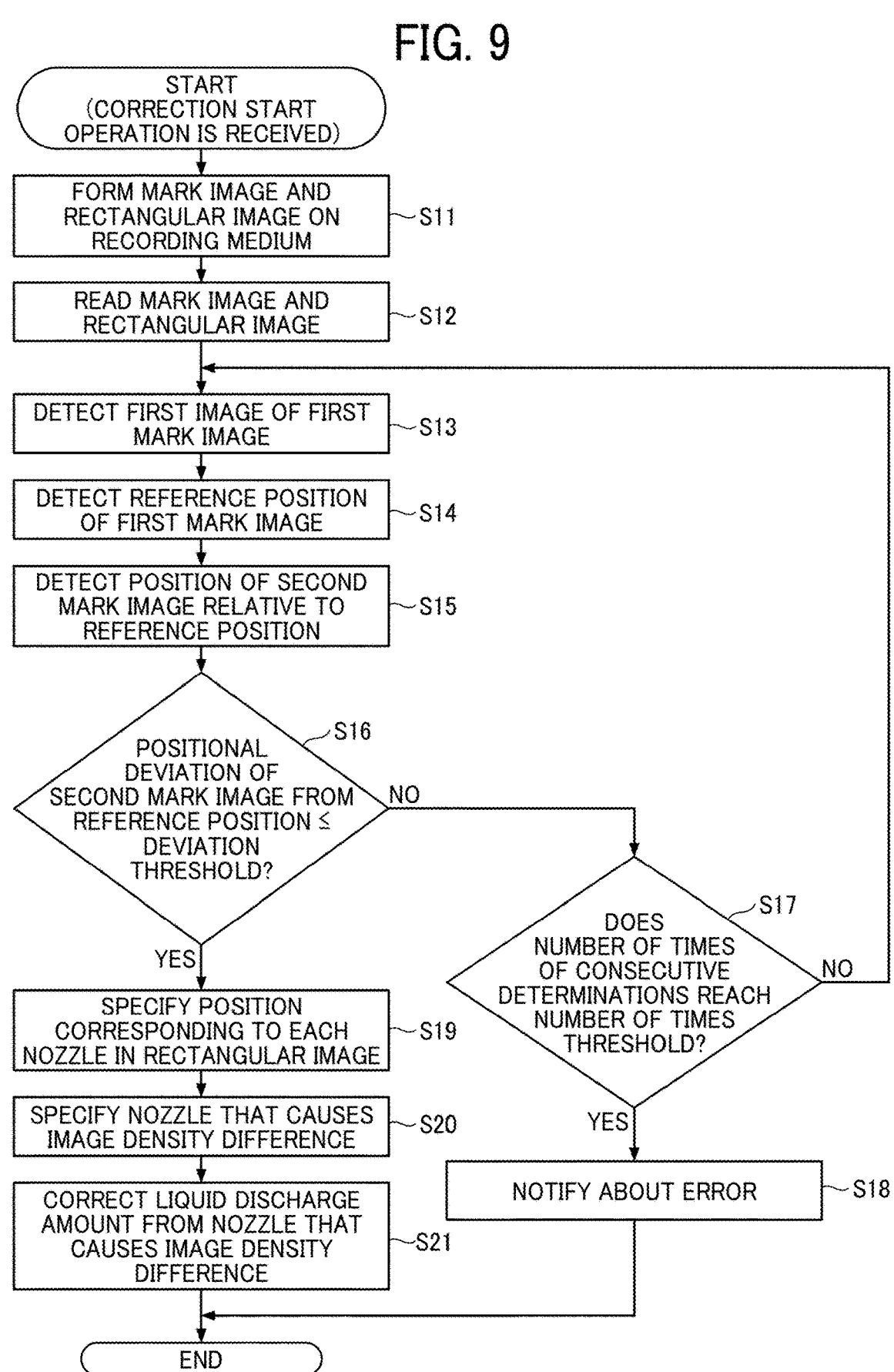
FIG. 9 is a flowchart of the operation of the liquid discharge apparatus of FIG. 1, according to the first embodiment.

FIG. 9 is a flowchart of an example of operation of the liquid discharge apparatus 100. FIG. 9 illustrates an operation in which the liquid discharge apparatus 100 corrects the density of an image to be formed on the recording medium P by the liquid discharge apparatus 100. For example, the liquid discharge apparatus 100 starts the operation illustrated in FIG. 9 on the condition that the liquid discharge apparatus 100 receives a correction start operation performed by the operator using the operation panel 102.

In step S11, the liquid discharge apparatus 100 forms the mark image 50 and the rectangular image 53 on the recording medium P by the image forming device 2. In the drying device 3, the liquid discharge apparatus 100 heats and dries the recording medium P on which the mark image 50 and the rectangular image 53 are formed by the dryer 31 while conveying the recording medium P by the conveyor 32.

In step S12, the liquid discharge apparatus 100 reads, by the reader 5, the mark image 50 and the rectangular image 53 on the recording medium P dried by the drying device 3. The liquid discharge apparatus 100 transmits the read information Im read by the reader 5 to the processing unit 6.

In step S13, the liquid discharge apparatus 100 detects the first image 511 of the first mark image 51 in the read information Im by the detection unit 63 of the processing unit 6.

In step S14, the liquid discharge apparatus 100 detects the reference position HP of the first mark image 51 in the read information Im by the detection unit 63.

In step S15, the liquid discharge apparatus 100 detects the position of each of the ten second mark images 52 relative to the reference position HP by the detection unit 63. The detection unit 63 transmits information on the detected position of each of the ten second mark images 52 to the determination unit 64.

In step S16, the liquid discharge apparatus 100 determines whether the positional deviation amounts of the ten second mark images 52 from the theoretical positions are all equal to or less than the positional deviation threshold by the determination unit 64 of the processing unit 6.

In step S16, when the determination unit 64 determines that one or more of the positional deviation amounts of the ten second mark images 52 are more than the positional deviation threshold (NO in step S16), in step S17, the liquid discharge apparatus 100 determines whether the number of times of consecutive determinations by the determination unit 64 has reached the threshold of the predetermined number of times.

When the determination unit 64 determines that the number of times of consecutive determinations has reached the threshold of the predetermined number of times (YES in step S17), the liquid discharge apparatus 100 notifies about an error (i.e., indicates an error) by the notification unit 66 in step S18. For example, the notification unit 66 causes the display 101 to display a notification about the error to notify the operator of the liquid discharge apparatus 100 of the error.

On the other hand, when the determination unit 64 determines that the number of times of consecutive determinations has not reached the threshold of the number of times (NO in step S17), the liquid discharge apparatus 100 performs the operations in step S13 and the subsequent steps again.

In addition, when the determination unit 64 determines that the positional deviation amounts of the ten second mark images 52 are all equal to or less than the positional deviation threshold (YES in step S16), in step S19, the liquid discharge apparatus 100 transmits information on the positions of the multiple nozzles 242 in the read information Im to the correction unit 67 by the determination unit 64. The correction unit 67 can specify the positions corresponding to the multiple nozzles 242 in the rectangular image 53 in the read information Im based on the information received from the determination unit 64.

In step S20, the liquid discharge apparatus 100 specifies a nozzle that causes a density difference among the multiple nozzles 242 based on the rectangular image 53 by the correction unit 67.

In step S20, the liquid discharge apparatus 100 corrects the discharge amount of liquid discharged from the nozzle that causes the density difference among the multiple nozzles 242 by the correction unit 67 to prevent the density difference.

As described above, the liquid discharge apparatus 100 can correct the density of an image to be formed on the recording medium P by the liquid discharge apparatus 100 based on the mark image 50 and the rectangular image 53 formed on the recording medium P.

Display Screen by Display

Various display screens by the display 101 will be described below with reference to FIGS. 10 to 12. FIG. 10 is a diagram illustrating an example of a display screen of the detection result of the ten second mark images 52 by the display 101. FIG. 11 is a diagram illustrating an example of a display screen of the notification by the display 101. FIG. 12 is a diagram illustrating an example of a display screen of the positional deviation threshold by the display 101.

In the example illustrated in FIG. 10, the display 101 displays the comparison results between the detected values and the theoretical values of the positions of the ten second mark images 52 on a display screen 101a.

In the example illustrated in FIG. 11, the display 101 displays, on a display screen 101b, a notification that the positional deviation of the second mark image 52 from the theoretical position is large and a notification that prompts the operator to re-form the mark image 50 on the recording medium P.

In the example illustrated in FIG. 12, the display 101 displays the positional deviation threshold of the second mark image 52 on a display screen 101c. The display screen 101c includes a text box 111 and increase and decrease buttons 112. The operator of the liquid discharge apparatus 100 can change the positional deviation threshold by operating the increase and decrease buttons 112.

Second Embodiment

A second embodiment of the present disclosure is described below. In the following description, names and reference signs similar to those of the first embodiment described above denote like or equivalent components, and a detailed description thereof may be omitted as appropriate.

The liquid discharge apparatus according to the present embodiment is different from the first embodiment in that the liquid discharge apparatus includes two or more readers disposed at different positions in the width direction B, and the first mark image and the multiple second mark images are formed within a reading range of each of the two or more readers in the recording medium.

16

Figure 13:
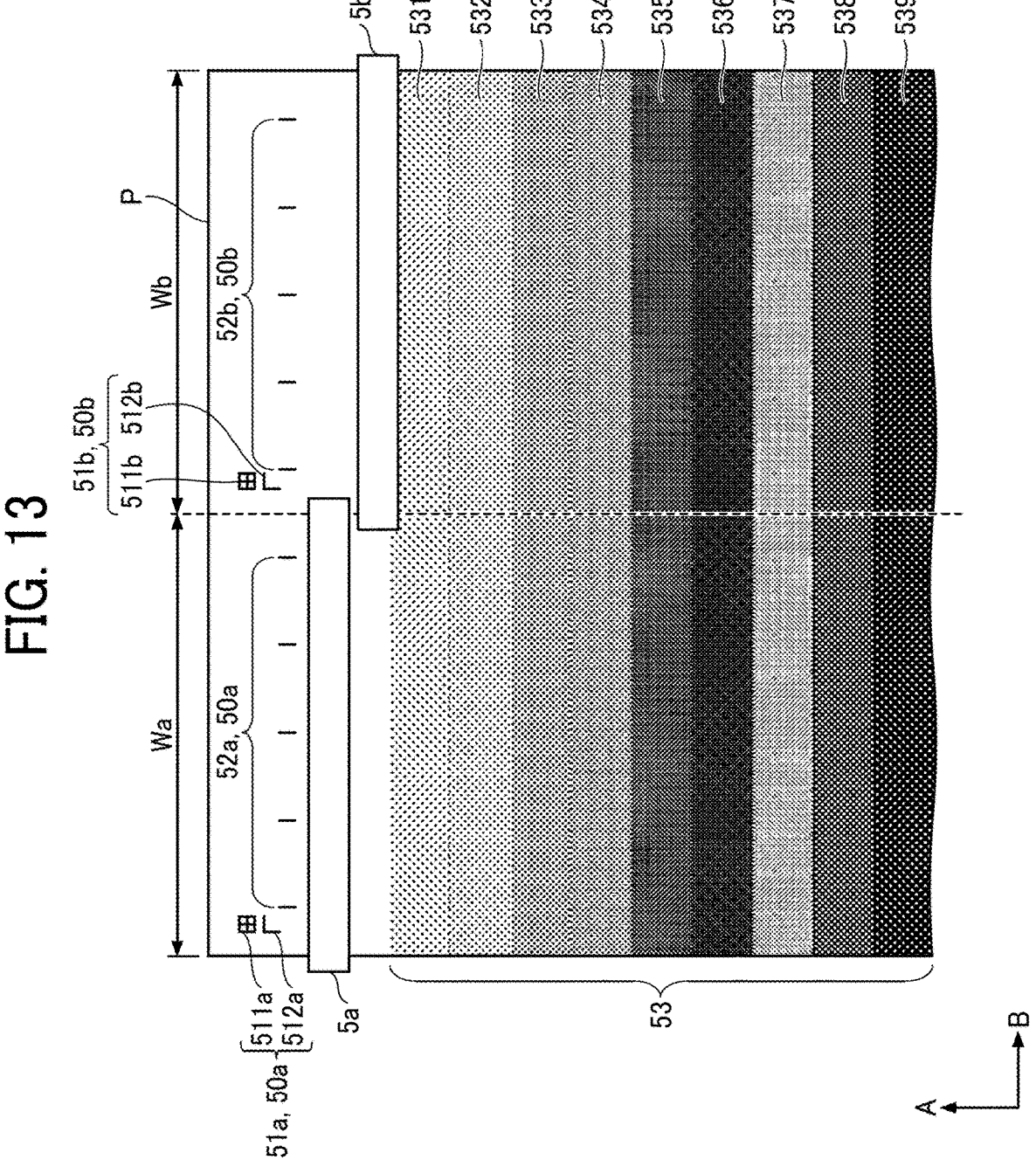
FIG. 13 is a diagram illustrating a positional relationship between a recording medium on which a mark image is formed and a reader of a liquid discharge apparatus according to a second embodiment of the present disclosure.

FIG. 13 is a diagram illustrating an example of a positional relationship between a recording medium P on which a mark image 50 is formed and two readers 5a and 5b according to the present embodiment.

In the example illustrated in FIG. 13, the reader 5a and the reader 5b are disposed at different positions in the width direction B. The reader 5a and the reader 5b are disposed at positions slightly shifted from each other in the conveyance direction A and partially overlap each other in the width direction B. With this arrangement, the readers 5a and 5b can read the entire recording medium P in the width direction B without omission.

The reader 5a and the reader 5b may be disposed without overlapping each other in the width direction B as long as the reader 5a and the reader 5b are disposed at different positions in the width direction B. The reader 5a and the reader 5b may be disposed at different positions or substantially the same position in the conveyance direction A.

The reader 5a can read the recording medium P in a reading range Wa in the width direction B. The reader 5b can read the recording medium P in a reading range Wb in the width direction B. The width of the reading range Wa and the width of the reading range Wb may be the same or different.

The recording medium P according to the present embodiment can include mark images 50a and 50b. The mark image 50a can include a first mark image 51a and multiple second mark images 52a. The first mark image 51a can include a first image 511a and a second image 512a. The mark image 50b can include a first mark image 51b and multiple second mark images 52b. The first mark image 51b can include a first image 511b and a second image 512b.

In the example illustrated in FIG. 13, the mark images 50a and 50b are formed in reading ranges of readers 5a and 5b in the recording medium P, respectively. Specifically, the first mark image 51a and the five second mark images 52a are formed in the reading range Wa of the reader 5a in the width direction B. The first mark image 51b and the five second mark images 52b are formed in the reading range Wb of the reader 5b in the width direction B. The number of the second mark images 52a or 52b is not limited to five, and may be changed as appropriate according to, for example, the size of the discharge head 240 illustrated in FIG. 2 in the width direction B.

For example, when one reader reads the recording medium P, a reading range in the width direction B may be limited, and the recording medium P having a large width in the width direction B may not be read by the one reader. In addition, if a reader having a large reading range is mounted on the liquid discharge apparatus to read the recording medium P having a large width in the width direction B, the manufacturing cost of the liquid discharge apparatus may be increased or the liquid discharge apparatus may be increased in size.

The liquid discharge apparatus according to the present embodiment includes the two readers 5a and 5b disposed at different positions in the width direction B, and reads different reading ranges in the width direction B by the two readers 5a and 5b so as to widen the limitation of the reading range. Further, the first mark image and the multiple second mark images are formed within each of the reading ranges of the two readers 5a and 5b in the recording medium P, and thus the density correction of the image described in the first embodiment can be performed using the read information by the two readers 5a and 5b. The other effects of the present embodiment are the same as those of the first embodiment.

The number of readers according to the present embodiment is not limited to two, and may be three or more in accordance with the width of the recording medium P in the width direction B. The first mark image 51 and the multiple second mark images 52 may be formed in each of the reading ranges of the multiple readers on the recording medium P.

Although some embodiments are described above, the above-described embodiments are merely examples and do not limit the present disclosure. Modifications and variations of the embodiments can be made without departing from the spirit and scope of the disclosure described in the claims unless limited in the above description.

The liquid discharge apparatus according to the above-described embodiments can correct not only the density of the image to be formed on the recording medium P but also the position of the image to be formed on the recording medium P based on the mark image formed on the recording medium P.

In the above-described embodiments, examples of the liquid discharged from the liquid discharge unit 24 include a solution, a suspension, or an emulsion that contains, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; or an edible material, such as a natural colorant. These liquids can be used for, e.g., inkjet ink, coating paint, surface treatment solution, a liquid for forming components of electronic element or light-emitting element or a resist pattern of electronic circuit, or a material solution for three-dimensional fabrication.

The recording medium P represents, for example, a medium onto which liquid is adhered and fixed, a medium into which liquid adheres and permeates.

Specific examples of the "medium onto which liquid can adhere" include, but are not limited to, a body of a vehicle, a construction material, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

The numbers such as ordinal number and quantity used in the description of the above embodiments are all illustrative for the purpose of describing the technology of the embodiments of the present disclosure, and the embodiments of the present disclosure are not limited to the illustrative numbers. Further, a connection relation between the components is exemplified for the purpose of describing the technology of the embodiments of the present disclosure, and the connection relation to enable the functions of the present disclosure is not limited to the connection relation as described above.

Division of functional blocks illustrated in the block diagram is an example, and a plurality of blocks may be implemented as one block, one block may be divided into a plurality of blocks, or some functions may be transferred to another block. Further, functions of a plurality of blocks having similar functions may be processed in parallel or in time division by a single piece of hardware or software. Some or all of the functions according to the above embodiments of the present disclosure may be distributed to a plurality of computers.

Each function of the embodiments described above can be implemented by one processing circuit or a plurality of processing circuits. The term "processing circuit or circuitry" in the present specification includes a programmed processor to execute each function by software, such as a processor implemented by an electronic circuit, and devices, such as an application-specific integrated circuit (ASIC), a digital signal processor (DSP), a field-programmable gate array (FPGA), and conventional circuit components arranged to perform the recited functions.

Aspects of the present disclosure are, for example, as follows.

Aspect 1

A liquid discharge apparatus can form an image on a recording medium conveyed in a conveyance direction. The liquid discharge apparatus includes the recording medium including a mark image formed by the liquid discharge apparatus, a reader to read the image formed on the recording medium, and a correction unit to correct the image to be formed on the recording medium based on read information read by the reader. The mark image includes a first mark image including two or more vertical lines extending in the conveyance direction and two or more horizontal lines extending in a width direction intersecting the conveyance direction. Each of the two or more vertical lines intersects each of the two or more horizontal lines.

In other words, a liquid discharge apparatus includes a conveyor, a liquid discharge unit, a reader, and circuitry. The conveyor conveys a recording medium in a conveyance direction. The liquid discharge unit forms an image on the recording medium conveyed to the liquid discharge unit by the conveyor. The reader reads the image formed on the recording medium by the liquid discharge unit. The circuitry causes the liquid discharge unit to form a mark image on the recording medium. The mark image includes a first mark image including two or more vertical lines extending in the conveyance direction and two or more horizontal lines extending in a width direction intersecting the conveyance direction. Each of the two or more vertical lines intersects or contacts each of the two or more horizontal lines. The circuitry further causes the reader to read the mark image on the recording medium to obtain read information of the mark image, corrects an image to be formed on the recording medium based on the read information, and causes the liquid discharge unit to form the image corrected based on the read information on the recording medium.

Aspect 2

In the liquid discharge apparatus according to Aspect 1, the first mark image includes three vertical lines extending in the conveyance direction and three horizontal lines extending in the width direction. Each of the three vertical lines intersects each of the three horizontal lines.

In other words, in the liquid discharge apparatus according to Aspect 1, the circuitry further causes the liquid discharge unit to form the mark image including the first mark image including three vertical lines extending in the conveyance direction and three horizontal lines extending in the width direction. Each of the three vertical lines intersects or contacts each of the three horizontal lines.

Aspect 3

The liquid discharge apparatus according to Aspect 1 or 2, further includes a detection unit and a determination unit. The detection unit detects a position of the mark image formed on the recording medium based on the read information read by the reader. The determination unit determines whether or not a positional deviation amount of the mark image from a theoretical position obtained based on size information of the recording medium is equal to or less than a predetermined positional deviation threshold.

In other words, in the liquid discharge apparatus according to Aspect 8 or 9, the circuitry further detects position of the first mark image on the recording medium, detects positions of the multiple second mark images on the recording medium based on the read information obtained by the reader, calculates a theoretical position of each of the multiple second mark images based on a size information of the recording medium, calculates a positional deviation of each of the multiple second mark images from the theoretical position, and determines whether an amount of the positional deviation is equal to or less than a positional deviation threshold for each of the multiple second mark images.

Aspect 4

The liquid discharge apparatus according to Aspect 3, further includes a notification unit to notify about an error when the number of times the determination unit consecutively determines that the positional deviation amount is larger than the positional deviation threshold reaches a predetermined number of times threshold.

In other words, in the liquid discharge apparatus according to Aspect 3, the circuitry further counts a number of times of consecutive determinations that the amount of the positional deviation of at least one of the multiple second mark images is more than the positional deviation threshold, and indicates an error in response to the number of times of the consecutive determinations reaching a threshold of the number of times.

Aspect 5

The liquid discharge apparatus according to Aspect 3 or 4, further includes a display to display the positional deviation amount.

In other words, the liquid discharge apparatus according to Aspects 3 or 4, further includes a display to display the amount of the positional deviation.

Aspect 6

The liquid discharge apparatus according to any one of Aspects 3 to 5, further includes a reception unit to receive a setting input of the positional deviation threshold by an operator.

In other words, the circuitry further receives a setting input of the positional deviation threshold from an outside of the liquid discharge apparatus.

Aspect 7

The liquid discharge apparatus according to any one of Aspects 1 to 6, further includes a discharge head having multiple nozzles to discharge a liquid within a predetermined range of the recording medium in the width direction. The recording medium further includes a rectangular image formed by the liquid discharge apparatus and extending in the width direction. The correction unit corrects the density of the image to be formed by each of the multiple nozzles based on the position of the mark image and the density of the rectangular image in the read information of the recording medium.

In other words, in the liquid discharge apparatus according to any one of Aspects 1 to 6, 8 and 9, the liquid discharge unit includes a discharge head having multiple nozzles from which a liquid is dischargeable within a predetermined range of the recording medium in the width direction. The circuitry further causes the liquid discharge unit to form a rectangular image extending in the width direction on the recording medium, and corrects a density of an image to be formed with the liquid discharged from each of the multiple nozzles based on a position of the mark image and a density of the rectangular image in the read information read by the reader.

Aspect 8

In the liquid discharge apparatus according to Aspect 7, the mark image further includes multiple second mark images. The liquid discharge apparatus further includes a detection unit to detect the position of each of the multiple second mark images with respect to a reference position specified based on the first mark image in the read information.

In other words, in the liquid discharge apparatus according to Aspect 1 or 2, the circuitry further causes the liquid discharge unit to form the mark image further including multiple second mark images, and detects a position of each of the multiple second mark images with respect to a reference position of the first mark image in the read information.

Aspect 9

In the liquid discharge apparatus according to Aspect 8, the second mark image is a vertical line extending in the conveyance direction, and the multiple second mark images are arranged in the width direction.

In other words, in the liquid discharge apparatus according to Aspect 8, the circuitry causes the liquid discharge unit to further form the multiple second mark images respectively including multiple vertical lines extending in the conveyance direction. The multiple vertical lines are arranged in the width direction.

Aspect 10

In the liquid discharge apparatus according to Aspect 8 or 9, the first mark image includes a first image and a second image. The first image includes two or more vertical lines extending in the conveyance direction and two or more horizontal lines extending in the width direction. Each of the two or more vertical lines intersects each of the two or more horizontal lines. The second image is formed within a predetermined distance from the first image. The second image includes one vertical line extending in the conveyance direction and one horizontal line extending in the width direction. The second image includes a position where the one vertical line and the one horizontal line intersect as the reference position.

In other words, in the liquid discharge apparatus according to any one of Aspects 3 to 6, 8, and 9, the circuitry further causes the liquid discharge unit to form the mark image including the first mark image including a first image including the two or more vertical lines extending in the conveyance direction and the two or more horizontal lines extending in the width direction and a second image formed within a predetermined distance from the first image. Each of the two or more vertical lines intersects or contacts each of the two or more horizontal lines. The second image includes one vertical line extending in the conveyance direction, one horizontal line extending in the width direction, and the reference position where the one vertical line intersects or contacts the one horizontal line.

Aspect 11

In the liquid discharge apparatus according to Aspect 10, the second image of the first mark image and the second mark image are formed on the recording medium so as to be separated from each other by a predetermined distance or more in at least one of the conveyance direction or the width direction.

In other words, in the liquid discharge apparatus according to Aspect 10, the circuitry further causes the liquid discharge unit to form the mark image including the first mark image including the first image and the second image on the recording medium. The second image of the first mark image is separated from the multiple second mark images by a predetermined distance in at least one of the conveyance direction or the width direction.

Aspect 12

In the liquid discharge apparatus according to any one of Aspects 7 to 11, the recording medium includes multiple rectangular images that are formed side by side in the conveyance direction and have densities different from each other.

In other words, in the liquid discharge apparatus according to Aspect 9, the circuitry further causes the liquid discharge unit to form multiple rectangular images including the rectangular image on the recording medium. The multiple rectangular images are formed side by side in the conveyance direction and have densities different from each other.

Aspect 13

In the liquid discharge apparatus according to any one of Aspects 9 or 12, when the rectangular image has a density difference, the correction unit changes the density so as to approach a lowest density among the densities of the rectangular image having the density difference.

In other words, the circuitry changes the density to be closer to a lowest density in the rectangular image having a density difference.

Aspect 14

The liquid discharge apparatus according to any one of Aspects 8 to 13, further includes two or more readers disposed at different positions in the width direction. The first mark image and the multiple second mark images are formed within a reading range of each of the two or more readers in the recording medium.

In other words, the liquid discharge apparatus according to any one of Aspects 3 to 6, 8, and 9, further includes two or more readers including the reader. The two or more readers are disposed at different positions in the width direction. The circuitry further causes the liquid discharge unit to form the mark image including the first mark image and the multiple second mark images within a reading range of each of the two or more readers on the recording medium.

Aspect 15

A liquid discharge method is performed by a liquid discharge apparatus that can form an image on a recording medium conveyed in a conveyance direction. The liquid discharge apparatus reads, by a reader, a mark image formed on the recording medium by the liquid discharge apparatus and corrects, by a correction unit, the image to be formed on the recording medium based on read information read by the reader. The mark image includes a first mark image including two or more vertical lines extending in the conveyance direction and two or more horizontal lines extending in the width direction. Each of the two or more vertical lines intersects each of the two or more horizontal lines.

In other words, a liquid discharge method includes conveying a recording medium in a conveyance direction, forming an image on the recording medium conveyed, reading the image formed on the recording medium, forming a mark image on the recording medium, reading the mark image on the recording medium to obtain read information, correcting an image to be formed on the recording medium based on the read information, and forming the image corrected based on the read information on the recording medium. The mark image includes a first mark image including two or more vertical lines extending in the conveyance direction and two or more horizontal lines extending in a width direction intersecting the conveyance direction on the recording medium. Each of the two or more vertical lines intersects or contacts each of the two or more vertical lines.

As described above, according to one aspect of the present disclosure, the technique of reducing erroneous detection of the mark image formed on the recording medium can be provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The invention claimed is:

1. A liquid discharge apparatus comprising:
   a conveyor to convey a recording medium in a conveyance direction;
   a liquid discharge unit to form an image on the recording medium conveyed to the liquid discharge unit by the conveyor;
   a reader to read the image formed on the recording medium by the liquid discharge unit; and
   a circuitry configured to:
   cause the liquid discharge unit to form a mark image on the recording medium, the mark image including a first mark image including:
      two or more vertical lines extending in the conveyance direction; and
      two or more horizontal lines extending in a width direction intersecting the conveyance direction, and
      each of the two or more vertical lines intersecting or contacting each of the two or more horizontal lines;
   cause the reader to read the mark image on the recording medium to obtain read information of the mark image;
   correct an image to be formed on the recording medium based on the read information; and
   cause the liquid discharge unit to form the image, corrected based on the read information, on the recording medium.

2. The liquid discharge apparatus according to claim 1, wherein the circuitry is further configured to cause the liquid discharge unit to form the mark image including the first mark image including three vertical lines extending in the conveyance direction and three horizontal lines extending in the width direction, and each of the three vertical lines intersects or contacts each of the three horizontal lines.

3. The liquid discharge apparatus according to claim 1, wherein the circuitry is further configured to:

cause the liquid discharge unit to form the mark image further including multiple second mark images; and detect a position of each of the multiple second mark images with respect to a reference position of the first mark image in the read information.

4. The liquid discharge apparatus according to claim 3, wherein the circuitry causes the liquid discharge unit to further form the multiple second mark images respectively including multiple vertical lines extending in the conveyance direction, and the multiple vertical lines are arranged in the width direction.

5. The liquid discharge apparatus according to claim 4, wherein the circuitry is further configured to:

detect position of the first mark image on the recording medium;

detect positions of the multiple second mark images on the recording medium based on the read information obtained by the reader;

calculate a theoretical position of each of the multiple second mark images based on a size information of the recording medium;

calculate a positional deviation of each of the multiple second mark images from the theoretical position; and determine whether an amount of the positional deviation is equal to or less than a positional deviation threshold for each of the multiple second mark images.

6. The liquid discharge apparatus according to claim 5, wherein the circuitry is further configured to:

count a number of times of consecutive determinations that the amount of the positional deviation of at least one of the multiple second mark images is more than the positional deviation threshold; and indicate an error in response to the number of times of the consecutive determinations reaching a threshold of the number of times.

7. The liquid discharge apparatus according to claim 5, further comprising a display to display the amount of the positional deviation.

8. The liquid discharge apparatus according to claim 5, wherein the circuitry is further configured to receive a setting input of the positional deviation threshold from an outside of the liquid discharge apparatus.

9. The liquid discharge apparatus according to claim 1, wherein the liquid discharge unit includes a discharge head having multiple nozzles from which a liquid is dischargeable within a predetermined range of the recording medium in the width direction, and the circuitry is further configured to:

cause the liquid discharge unit to form a rectangular image extending in the width direction on the recording medium; and correct a density of an image to be formed with the liquid discharged from each of the multiple nozzles based on a position of the mark image and a density of the rectangular image in the read information read by the reader.

10. The liquid discharge apparatus according to claim 3, wherein the circuitry is further configured to:

cause the liquid discharge unit to form the mark image including the first mark image including:

a first image including the two or more vertical lines extending in the conveyance direction and the two or more horizontal lines extending in the width direction, each of the two or more vertical lines intersecting or contacting each of the two or more horizontal lines; and a second image formed within a predetermined distance from the first image, the second image including one vertical line extending in the conveyance direction, one horizontal line extending in the width direction, and the reference position where the one vertical line intersects or contacts the one horizontal line.

11. The liquid discharge apparatus according to claim 10, wherein the circuitry is further configured to cause the liquid discharge unit to form the mark image including the first mark image including the first image and the second image on the recording medium, and the second image of the first mark image is separated from the multiple second mark images by a predetermined distance in at least one of the conveyance direction or the width direction.

12. The liquid discharge apparatus according to claim 9, wherein the circuitry is further configured to cause the liquid discharge unit to form multiple rectangular images including the rectangular image on the recording medium, and the multiple rectangular images are formed side by side in the conveyance direction and have densities different from each other.

13. The liquid discharge apparatus according to claim 9, wherein the circuitry is further configured to change the density to be closer to a lowest density in the rectangular image having a density difference.

14. The liquid discharge apparatus according to claim 3, further comprising two or more readers including the reader, wherein the two or more readers are disposed at different positions in the width direction, and the circuitry is further configured to cause the liquid discharge unit to form the mark image including the first mark image and the multiple second mark images within a reading range of each of the two or more readers on the recording medium.

15. A liquid discharge method comprising:

conveying a recording medium in a conveyance direction;

forming an image on the recording medium conveyed;

reading the image formed on the recording medium;

forming a mark image on the recording medium, the mark image including a first mark image including:

two or more vertical lines extending in the conveyance direction; and two or more horizontal lines extending in a width direction intersecting the conveyance direction on the recording medium, each of the two or more vertical lines intersecting or contacting each of the two or more vertical lines;

reading the mark image on the recording medium to obtain read information;

correcting an image to be formed on the recording medium based on the read information; and forming the image corrected based on the read information on the recording medium.

* * * * *